US011046125B2

(12) United States Patent
Petry Breier et al.

(10) Patent No.: US 11,046,125 B2
(45) Date of Patent: Jun. 29, 2021

(54) TIRE CONTAINING AN RFID TAG

(71) Applicants: CEITEC—CENTRO NACIONAL DE TECNOLOGIA ELETRÔNICA AVANÇADA S.A., Porto Alegre (BR); PIRELLI PNEUS LTDA, Santo André (BR)

(72) Inventors: Guilherme Petry Breier, Porto Alegre (BR); Ismael Trindade Fraga, Porto Alegre (BR); Eric Ericson Fabris, Porto Alegre (BR); Marcos Tadeu de Lorenzi, Boituva (BR); Guilherme Berzagui, Esteio (BR); Roberto Falkenstein, Santo André (BR); Roberto Tadayuki Yamada, Santo André (BR); Adiel Moura Nunes Bittencourt, Santo André (BR); Davi Menezes Lopes, Santo André (BR); Paulo de Tarso Mendes Luna, Porto Alegre (BR)

(73) Assignees: CEITEC—CENTRO NACIONAL DE TECNOLOGIA ELETRONICA AVANÇADA S.A., Porto Alegre (BR); PIRELLI PNEUS LTDA, Santo Andre (BR)

( * ) Notice: Subject to any disclaimer, the term of this patent is extended or adjusted under 35 U.S.C. 154(b) by 89 days.

(21) Appl. No.: 16/376,393

(22) Filed: Apr. 5, 2019

(65) Prior Publication Data

US 2020/0254827 A1 Aug. 13, 2020

(30) Foreign Application Priority Data

Feb. 11, 2019 (BR) .......................... 1020190028157

(51) Int. Cl.
*B60C 19/00* (2006.01)
*B60C 15/04* (2006.01)

(52) U.S. Cl.
CPC .............. *B60C 19/00* (2013.01); *B60C 15/04* (2013.01)

(58) Field of Classification Search
None
See application file for complete search history.

(56) References Cited

U.S. PATENT DOCUMENTS 4,911,217 A * 3/1990 Dunn ..................... B60C 13/001
152/152.1
6,147,659 A * 11/2000 Takahashi ............. B60C 9/2006
343/866

(Continued)

FOREIGN PATENT DOCUMENTS

DE 102017209539 A1 * 12/2018 ............. B60C 15/04

OTHER PUBLICATIONS

Machine Translation: DE-102017209539-A1, Broker B, (Year: 2021).*

*Primary Examiner* — Kendra Ly
(74) *Attorney, Agent, or Firm* — Hoglund & Pamias, PSC; Roberto J. Rios

(57) ABSTRACT

The present invention describes a tire, which shows the insertion of a passive UHF RFID tag at its moment of manufacture, in which said tag is affixed on top of the metallic part of the referred tire, more specifically on the bead rim, with the purpose of reducing the mechanical stress of the tire in question and allowing its tracking in the manufacturing chain since its first manufacturing stages.

10 Claims, 4 Drawing Sheets

(56) References Cited

U.S. PATENT DOCUMENTS

| | | | |
|---|---|---|---|
| 6,192,951 B1 * | 2/2001 | Maruyama | B60C 15/06 152/152.1 |
| 6,339,956 B1 * | 1/2002 | Huinink | B60C 15/06 152/152.1 |
| 2016/0092814 A1 * | 3/2016 | Yun | G06Q 10/087 264/40.1 |

* cited by examiner

TIRE CONTAINING AN RFID TAG

FIELD OF APPLICATION

This invention applies to the field of circular devices made of rubber, i.e. tires, which have in their composition the presence of passive RFID tags in ultra-high frequency and without battery.

The present invention describes a tire that, at its moment of manufacture, presents the insertion of a tag in order to promote the monitoring and automation of the manufacturing chain of said tire.

BACKGROUND OF THE INVENTION

Currently, when it comes to tires with the presence of RFID tags, most of these tags are commercially supplied by companies that manufacture them, so that they can later be installed in tires during the time of their manufacture, however, they present some problems, such as:

Performance problem (e.g. the range of the tag-reader communication) due to the tire construction, such as the presence of metal and restrictions on the orientation and physical location of the tag attachment on the tire;

Problem of tag robustness both during the tire manufacturing process (since the vulcanization process requires high temperature and pressure) and during use when mounted on a wheel (e.g. mechanical stress, torsion, friction, deformation, shock, pressurization, etc.).

Thus, in order to obtain a better performance, this invention describes a tire that presents the insertion of the RFID tag at the time of its manufacture, allowing the traceability of the production process from the initial stages of production as well as the definition of a strategic region that aims to maximize the communication distance between the tag-reader and to cause less mechanical stress, distancing itself from resulting problems, such as the low performance of the referred tag and the damage to the tire structure.

STATE OF THE ART

Document BR PI 0800915-5 describes a tire with the presence of a RFID tag and a method of manufacture a tire, in which the tire presents besides a filler mass, a second mass placed above the bending part of the carcass ply (1) which forms a material interface that favors the mechanical robustness and allows optimizing the communication distance.

However, in said document, the tag is placed in the interface region between the two masses of tire filling, moving away from the present invention, wherein the tag is placed on top of the rim of the tire bead, in order to take advantage of the surface provided by the rim wire.

Document WO2017046245 describes a tire comprising a passive transponder and a method for reading the data, in which the solution proposed in this document applies implicitly to metallic tires, those used on tractors and trucks, which have metallic wire all over the carcass ply.

In this document, the tag is placed in a region of the tire that is little exposed to mechanical deformations and is not optimized for metals, thus being away from the metal parts of the tire, i.e., the thread of the carcass ply and the bead rim, distancing itself from this invention, in which the tag is directly placed in the metal part of the tire, i.e., on top of the bead rim.

Document KR20060119206 describes a tire that features an RFID tag and protects the tag location on the bead rim of the tire within the rubber filled mass part, also called "Apex".

However, said document distances itself from the present invention, since in the present proposal, the RFID tag is placed on the bead rim for the use of the electromagnetic properties of the available metallic surface, such as antenna gain, and not only in the part ("Apex") of the bead with mass filling, as is the case of document KR20060119206.

The geometry of the bead rim is not favorable to the conversion of an electromagnetic field into a near electric field. The metal surface provided by this ring allows the implementation of a resonant dielectric cavity antenna or monopole type antenna, using this surface as ground plane, which means that the closer the tag is to the metal surface, the greater the antenna gain and therefore the greater the distance of communication tag-reader.

Document DE202017102186 describes the placement of RFID tags on tires in a generic manner, where the distance between the tag and the outer edge of the tire is less than $\frac{1}{10}$th of the wavelength and/or less than 25 mm.

Thus, the above-mentioned application is far from the present invention, since it does not explicitly define if the tag can be positioned on top of the bead rim and does not show a possible functioning of the tag by field coupling close to the metallic structures of the tire.

Application WO2017130956 describes a tire of the metallic type, that has a carcass ply as metallic wires, in which the tag present in the referred tire works with inductive coupling between the chip and is connected to a first antenna (inductor) and a second antenna of the "dipole" type. In addition, the carcass ply wires act as a third antenna and the tag is placed at a certain distance from the wires that optimize the communication distance between the tag-reader.

This way, the present invention is far from the document in question, because it makes use of a metallic coupling to the bead rim present in the tire, instead of ply wires.

Document U.S. Pat. No. 7,050,017 describes the many ways a RFID tag can be applied on a tire, which are: through capacitive coupling between the tag and the wires of the metal plies; through the tag positioned on the sides of the tire without metals, between the wires of the metal is and the bead ring.

In the document, said tag is electrically attached to the metal ply wires and to the bead rim and, thus, forms a "slot" type antenna structure.

Thus, the present invention is far from the above-mentioned document given that, besides the tag being positioned on top of the bead rim, the structure obtained does not constitute a "slot" type antenna.

Application WO2017136752 describes a bladder used in the manufacture of a tire that contains an RFID tag. During the manufacture of the tire, the tag is placed on the inner wall of the part of the tire that serves as a mold for the bladder, and the filling thereof through pressure and temperature (vulcanization) causes the tag to stick to the bladder.

Although document WO2017136752 claims the location of the tag on the "bead", it is far from the present invention, since the tag, in the present invention, is affixed on top of the bead rim during the manufacturing process and not on the "elastomeric" part of the tire.

Therefore, it can be concluded that the present invention is far from the documents of the state of the art presented herein, since none of them refers to tires that present an RFID tag affixed on top of the metallic region of the referred tire, preferably on the outer edge of the rims of the bead, in order to reduce the mechanical stress both during the manufacture and during the use of the tire in question.

SUMMARY OF THE INVENTION

The present invention describes a tire, which shows the insertion of a passive UHF RFID tag at its moment of manufacture, in which said tag is affixed on top of the metallic part of the referred tire, more specifically on the bead rim, with the purpose of reducing the mechanical stress of the tire in question and allowing its tracking in the manufacturing chain since its first manufacturing stages.

BRIEF DESCRIPTION OF THE FIGURES

The invention can be better understood through the brief description of the figures below.

DETAILED DESCRIPTION OF THE INVENTION

Figure 1:
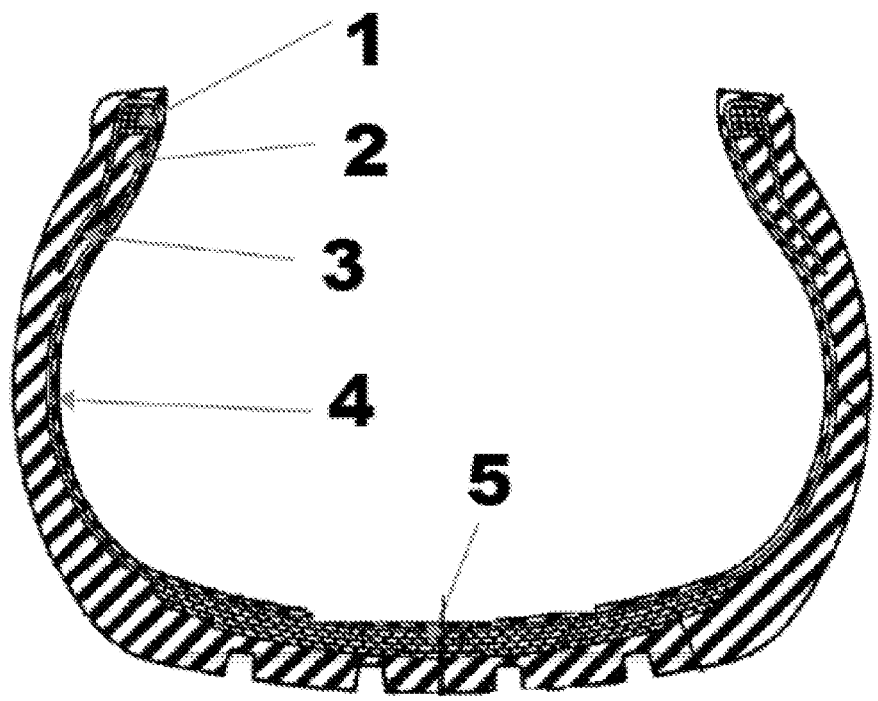
FIG. 1 shows a sectional view of the components that make up a tire.

The present invention describes a tire, which is composed of a bead rim (1), rubber mass filling (2), folding of the carcass ply (3), carcass ply (4) and reinforcement screens (5), as shown in FIG. 1.

Figure 2:
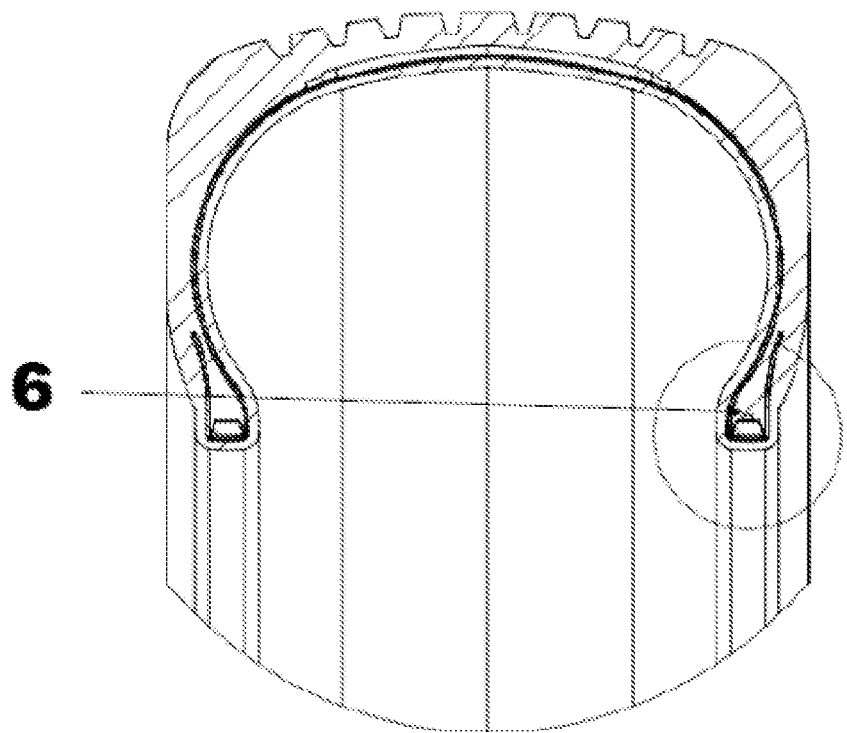
FIG. 2 shows a cut view of the tire, with the presence of the RFID tag.
Figure 3:
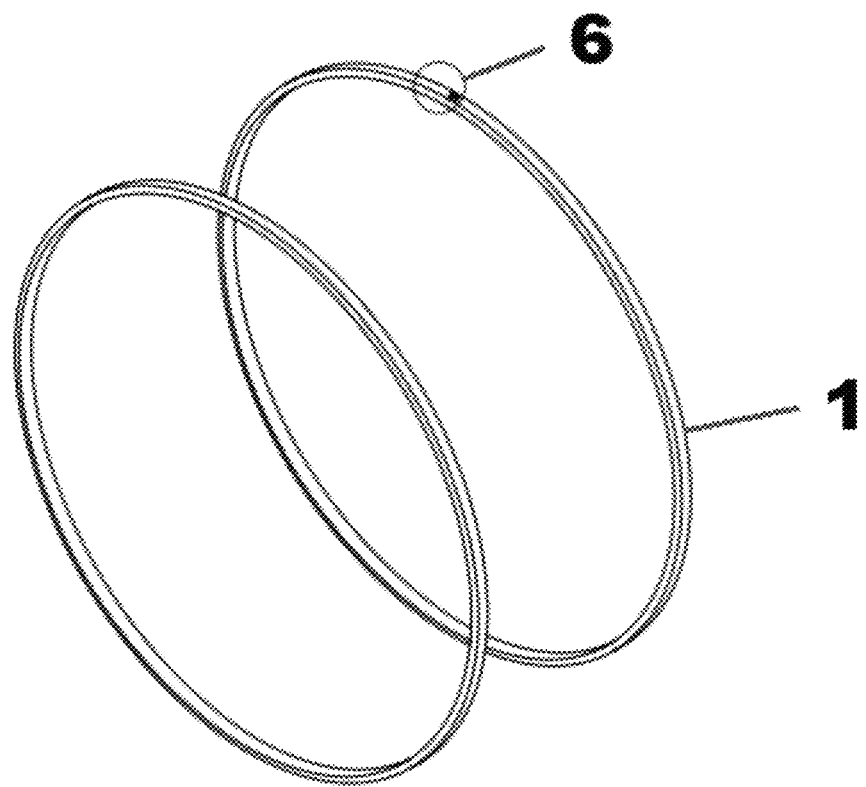
FIG. 3 shows a perspective view of the outer edge of the bead rim.

At the moment of its manufacture, the referred tire presents the fixation of a passive UHF RFID tag (6), as evidenced in FIG. 2, in its bead rim (1), more specifically in the outer edge (7) of the referred rim, as evidenced in FIG. 3.

The use of RFID tags in tires aims to monitor, automate and track the manufacturing chain from the early stages of manufacture thereof.

Currently, the RFID tags present in the tires are installed in them during the moment of their manufacture and, however, they present some problems, such as difficulty of communication between the tag-reader and mechanical stresses.

Thus, the existing solution in the state of the art to try to mitigate the failure and maximize the distance of communication between the tag-reader is the installation of tags in regions far from the metal parts of the tire.

However, the present invention, in order to be totally innovative and inventive, describes an RFID tag (6) that will be installed on the metallic part of the tire, more specifically on the bead rim (1), where the referred tag (6) will make use of the metallic surface to increase the equivalent antenna area, increasing the efficiency of capture and reflection of electromagnetic energy and, thus, increasing the communication distance between the reader and the tag.

Regarding the reduction of mechanical stress, the present invention describes an RFID tag (6) that is installed in the bead region, preferably in the outer edge of one of the bead rims (1), which is the zone of the tire that suffers the least mechanical stress, both during the manufacture and the use thereof.

The lower mechanical stress in the bead region can be justified due to the low deformation caused by the unevenness of roads with holes, steps and stones, besides being a region that suffers less stretching, contraction or torsion when compared to the regions of the sidewall of the tire.

The present invention does not restrict the way of affixing the tag (6) to the bead rim (1), i.e., the referred tag (6) can be glued, can be attached by means of a staple, or can be tied by means of a cotton or rubberized cotton thread.

The best option to affix the RFID tag (6) to the bead rim (1), in order to guarantee a reading range, robustness of that tag (6) to the manufacturing process and impact on the robustness of the tire, will depend on the type of tire and the type of tag (6) that will be affixed to the rim (1).

Thus, the fixing of an RFID tag (6) on the bead rim (1) of a tire, in addition to allowing the protection and integrity of the referred tag (6) in the subsequent stages of tire manufacturing, enhances the communication distance between the tag-reader and thus facilitates the tracking and monitoring of the manufacturing chain of said tire.

Figure 4:
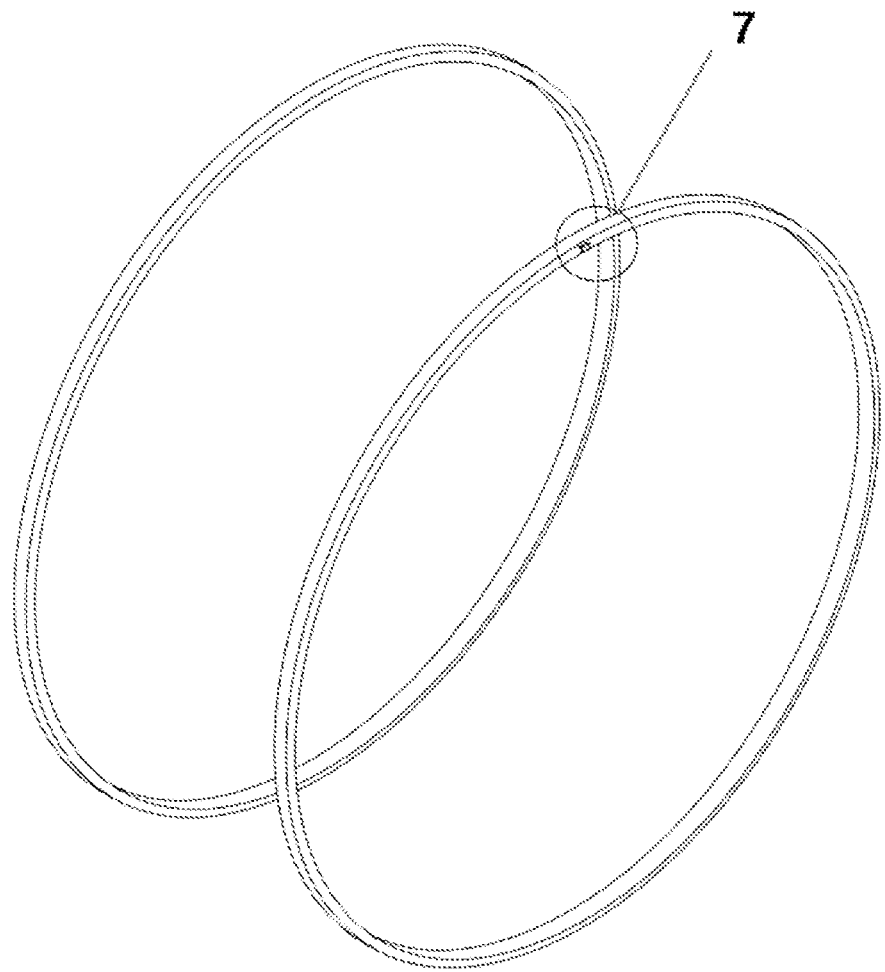
FIG. 4 shows a perspective view of one of the side edges of the bead rim.
Figure 5:
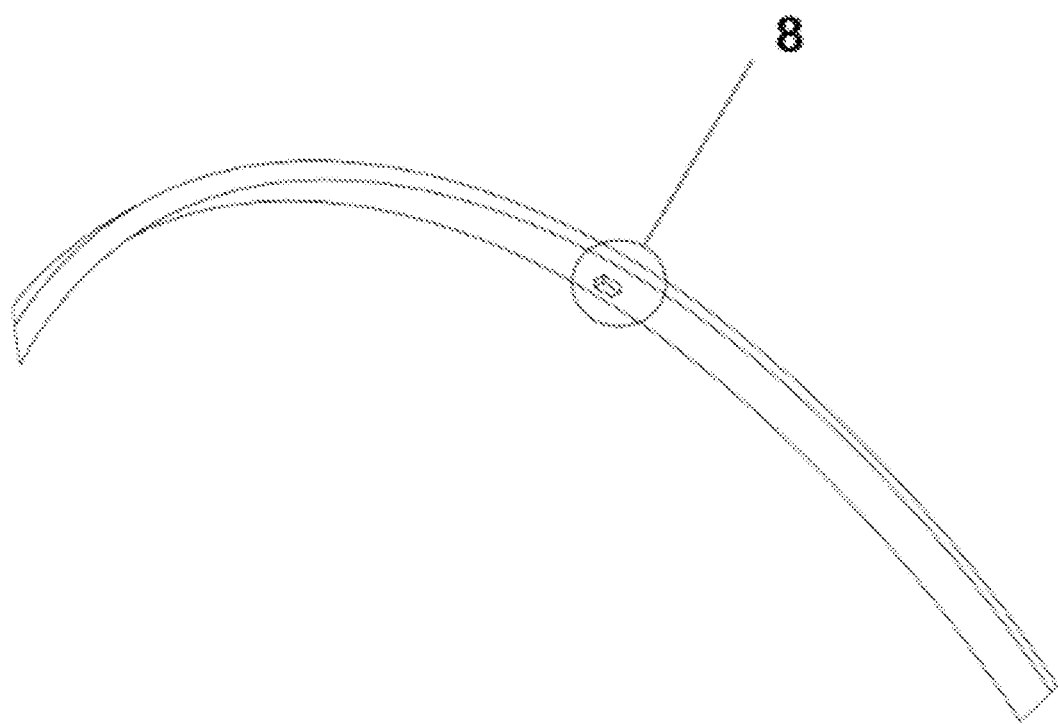
FIG. 5 shows a perspective view of an inner edge of the bead rim.

Depending on the orientation of the reading antennas in relation to the position of the tire on a given assembly line, other RFID tag attachment locations (6) on the bead rim (1) of the tire can still increase the distance of communication tag-reader, such as the lateral edges (7), as shown in FIG. 4, and the inner edge (8), as shown in FIG. 5.

This invention was disclosed in this specification in terms of its preferred embodiment. However, other modifications and variations are possible from the present description, being still inserted in the scope of the invention revealed here.

The invention claimed is:

1. A tire comprising: a bead rim (1), a rubber mass filling (2), a folding of a carcass ply (3), the carcass ply (4), reinforcement screens (5) and an UHF RFID tag (6) including an integrated antenna, wherein said UHF RFID tag (6) is affixed with no electrical contacts to a surface of a metal part of a tire where the bead rim (1) is located so that the surface of the metal part acts as a ground plane together with the integrated antenna to form a resonant dielectric antenna in order to effectively increase the gain of the integrated antenna.

2. The tire according to claim 1, wherein said RFID tag (6) is affixed on an outer edge (7) of the bead rim (1).

3. The tire according to claim 2, wherein said RFID tag (6) is affixed on the outer edge (7) of the bead rim (1) at the time of manufacturing the tire.

4. The tire according to claim 1, wherein said RFID tag (6) is affixed on one of the side edges (7) of the bead rim (1).

5. The tire according to claim 4, wherein said RFID tag (6) is affixed on said one of the side edges (7) of the bead rim (1) at the time of manufacturing the tire.

6. The tire according to claim 1, wherein said RFID tag (6) is affixed on an inner edge (8) of the bead rim (1).

7. The tire according to claim 6, wherein said RFID tag (6) is affixed on the inner edge (8) of the bead rim (1) at the time of manufacturing the tire.

8. The tire according to claim 1, wherein the RFID tag (6) is affixed on the bead rim (1) with staples.

9. The tire according to claim 1, wherein the RFID tag (6) is tied to the bead rim (1) with wires.

10. The tire according to claim 1, wherein the RFID tag (6) is glued on the bead rim (1).

* * * * *